US007415760B2

(12) United States Patent
Elias

(10) Patent No.: US 7,415,760 B2

(45) Date of Patent: Aug. 26, 2008

(54) APPARATUS FOR PRE-FORMING A TWISTED-PAIR ELECTRICAL CABLE

(75) Inventor: Mark Elias, Eastpointe, MI (US)

(73) Assignee: SBC Knowledge Ventures, L.P., Reno, NV (US)

( * ) Notice: Subject to any disclaimer, the term of this patent is extended or adjusted under 35 U.S.C. 154(b) by 298 days.

(21) Appl. No.: 11/285,635

(22) Filed: Nov. 22, 2005

(65) Prior Publication Data

US 2007/0113401 A1 May 24, 2007

(51) Int. Cl.
*B23P 19/00* (2006.01)

(52) U.S. Cl. ............................ 29/747; 29/749; 29/751; 29/753; 29/755; 29/861

(58) Field of Classification Search ........... 29/745–749, 29/751–758, 759–760, 860–862, 868, 566.1, 29/566.2, 566.4, 33 M, 33 F; 439/310, 409, 439/417

See application file for complete search history.

(56) References Cited

U.S. PATENT DOCUMENTS

| | | | |
|---|---|---|---|
| 3,872,567 A | 3/1975 | Cea et al. | |
| 3,953,925 A | 5/1976 | Wilson | |
| 3,987,531 A | 10/1976 | Tucci | |
| 4,409,734 A * | 10/1983 | Baraglia et al. | 29/861 |
| 5,010,642 A * | 4/1991 | Takahashi et al. | 29/868 |
| 5,481,794 A * | 1/1996 | Fischer et al. | 29/747 |
| 5,577,320 A * | 11/1996 | Shinohara et al. | 29/860 |
| 5,996,224 A | 12/1999 | Sullivan | |
| 6,105,229 A | 8/2000 | Sullivan | |
| 6,161,278 A | 12/2000 | Easter et al. | |
| 6,370,769 B1 * | 4/2002 | Lilienthal, II | 29/861 |
| 6,807,728 B2 | 10/2004 | Griffin et al. | |
| 6,877,218 B2 | 4/2005 | Perea, Jr. et al. | |
| 7,103,968 B2 * | 9/2006 | Karrasch | 29/758 |

* cited by examiner

*Primary Examiner*—Minh Trinh
(74) *Attorney, Agent, or Firm*—Brooks Kushman P.C.

(57) ABSTRACT

A wiring block pre-forms a cable end having twisted wires for subsequent installation of a plug on the cable end. A back end of the block leading to a cavity within the block receives the cable end such that a cable portion adjacent to the cable end sits inside the cavity. A front end of the block has pass holes leading to troughs extending through the block between the cavity and the front end. The troughs receive the wires at the cable end with the wires protruding from the holes. When the cable end is inserted into the block the wires at the cable end have a length within the troughs corresponding to the plug trough lengths and a configuration within the troughs corresponding to the plug trough configuration with the cable portion adjacent to the cable end having a length within the cavity corresponding to the plug cavity length.

1 Claim, 4 Drawing Sheets

APPARATUS FOR PRE-FORMING A TWISTED-PAIR ELECTRICAL CABLE

BACKGROUND OF THE INVENTION

1. Field of the Disclosure

The present disclosure relates to pre-forming an end of a category 5 (CAT5) unshielded twisted pair (UTP) cable used for Ethernet wiring.

2. Background Art

A category 5 (CAT5) unshielded twisted pair (UTP) cable typically has eight individual wires which are arranged in four twisted wire pairs. Insulation coverings respectively surround and insulate the individual wires. The insulation coverings have different colors which identify the individual wires. An outer insulation sheath surrounds and insulates the twisted wire pairs.

Users such as technicians install a RJ45 plug on an end of a CAT5 UTP cable in order to terminate the cable for interconnection into a RJ45 jack. Installing a RJ45 plug on a terminating end of a CAT5 UTP cable requires that a user initially strip the outer insulation sheath from the terminating end of the cable in order to expose the twisted wire pairs. The user then untwists and arranges the individual wires of the exposed twisted wire pairs into a specific configuration according to the color codes of the individual wires. The user then inserts the terminating end of the cable into the RJ45 plug such that the individual wires are individually received by the proper wire troughs of the RJ45 plug with a portion of the cable adjacent to the terminating end being received by the RJ45 plug as well. The user then crimps the RJ45 plug onto the terminating end of the cable which has been inserted into the RJ45 plug.

This operation of installing a RJ45 plug on a terminating end of a CAT5 UTP cable requires a high degree of manual dexterity and experience on the part of users. For instance, the individual wires are not laid out in the RJ45 plug by pairs, and the lengths of the resulting individual wires are relatively short given the length of a RJ45 plug. Furthermore, many users are not completely aware of the various color coding schemes used for CAT5 UTP terminations.

For a proper termination, the individual wires of the exposed twisted wire pairs should not be untwisted more than two twists and the length of the individual wires should be such that the sheath of the cable portion adjacent to the terminating end of the cable extends into the RJ45 plug. With a proper termination, the individual wires and the adjacent cable portion can be crimped properly such that the individual wires make contact with electrical connectors of the RJ45 plug and such that the adjacent cable portion has a sufficient amount of the outer insulation sheath to provide a strain relief.

This operation often has to be repeated to obtain a satisfactory combination of the operation elements prior to attempting to crimp the RJ45 plug onto the cable. Failure to provide the correct positioning or presentation frequently requires that the just crimped end of the cable be cut off and another attempt made to complete the task of installing a RJ45 plug on another terminating end of the cable.

BRIEF DESCRIPTION OF THE DRAWINGS

The present disclosure is pointed out with particularity in the appended claims. However, other features of the present disclosure will become more apparent and the present disclosure will be best understood by referring to the following detailed description in conjunction with the accompanying drawings in which:

DETAILED DESCRIPTION OF THE PREFERRED EMBODIMENT(S)

Figure 1:
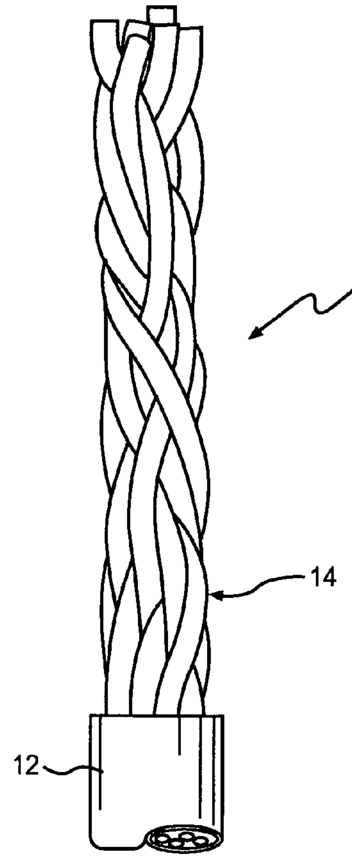
FIG. 1 illustrates a terminating end of a category 5 (CAT5) unshielded twisted pair (UTP) cable in which the outer insulation sheath of the cable has been removed.

The present disclosure discloses an apparatus for pre-forming a terminating end of a cable having insulated twisted wire pairs for subsequent installation of a plug on the cable. The insulation of the terminating end of the cable is stripped such that the wires of the twisted wire pairs at the terminating end of the cable are exposed. The apparatus includes a wiring block. A back end of the wiring block leads to a cavity arranged within the wiring block. The back end of the wiring block receives the terminating end of the cable such that a portion of the cable which is adjacent to the terminating end of the cable sits inside the cavity. A front end of the wiring block has pass through holes leading to respective ones of wire troughs extending through the wiring block between the cavity and the front end of the wiring block. The wire troughs of the wiring block individually receive the wires at the terminating end of the cable such that the wires are arranged in a configuration corresponding to a proper plug termination with the wire ends protruding out from the wiring block through the pass through holes.

The cavity and the wire troughs of the wiring block correspond to a cavity and wire troughs of a plug to be installed on the cable such that when the terminating end of the cable is inserted into the wiring block the wires at the terminating end of the cable have a length within the wire troughs of the wiring block corresponding to the length of the wire troughs of the plug, the configuration of the wires at the terminating end of the cable within the wire troughs of the wiring block corresponds to a configuration of the wire troughs of the plug for the proper plug termination, and the portion of the cable adjacent to the terminating end of the cable has a length within the cavity of the wiring block corresponding to the length of the cavity of the plug.

The present disclosure further discloses a method of installing a plug on a cable having insulated twisted wire pairs. The method includes stripping insulation from a terminating end of the cable to expose the twisted wire pairs at the terminating end of the cable. The wires of the exposed twisted wire pairs are arranged into a configuration which corresponds to a proper plug termination. A wiring block is provided in which a back end of the wiring block leads to a cavity arranged within the wiring block and in which a front end of the wiring block has pass through holes respectively leading to wire troughs extending through the wiring block between the cavity and the front end of the wiring block. The terminating end of the cable is inserted through the back end of the wiring block such that the wires at the terminating end of the cable are inserted into respective wire troughs of the wiring block in accordance with the proper plug termination and such that the ends of the wires protrude out from the wiring block through the pass through holes. The protruding wire ends are pulled away from the wiring block until the insulation of the cable adjacent to the terminating end of the cable seats itself inside the cavity of the wiring block. The protruding wire ends are cut off and the cable is then removed from the wiring block. The terminating end of the cable is then inserted into a plug. The plug is then crimped to the terminating end of the cable.

The cavity and the wire troughs of the wiring block generally correspond to a cavity and wire troughs of a plug to be installed on the cable such that when the terminating end of the cable is inserted into the wiring block the wires at the terminating end of the cable have a length within the wire troughs of the wiring block which corresponds to the length of the wire troughs of the plug and such that a portion of the cable adjacent to the terminating end of the cable has a length within the cavity of the wiring block which corresponds to the length of the cavity of the plug.

In accordance with the present disclosure, a tool (i.e., a wiring aid) is provided for assisting technicians (i.e., users) in pre-forming the ends of category 5 (CAT5) unshielded twisted pair (UTP) cables used for Ethernet wiring. The wiring aid is designed to layout in a correct sequence the individual wires that are part of the exposed twisted wire pairs at a terminating end of the cable, provide for the proper length of the individual wires, and provide for the proper length of the sheathed portion of the cable at the terminating end of the cable.

The wiring aid assists a user in reducing guesswork involved in removing a proper amount of the outer sheathing from a CAT5 UTP cable and in properly positioning the individual wires into a RJ45 plug. The wiring aid provides a means of pre-forming the individual wires not only by color code but to the correct length as well.

The wiring aid includes a handle and a wiring block that attaches to the handle. The handle includes insignia representing diagrams of the most common wiring schemes used for CAT5 Ethernet terminations. A user may refer to the diagrams when inserting a pre-formed terminating end of a CAT5 UTP cable into a RJ45 plug to ensure that the individual wires are inserted into the proper wire troughs of the RJ45 plug. The wiring block attaches to the handle via a pair of pivots that extend from the handle into respective holes in the sides of the wiring block. The pivots permit the wiring block to be positioned in a way that is most advantageous to a user when using the wiring aid to pre-form a terminating end of a CAT5 UTP cable.

The wiring block is shaped like a standard RJ45 plug but is different than a standard RJ45 plug in several aspects. For instance, unlike a standard RJ45 plug, the wiring block does not have a retaining clip or any electrical connectors nor does the wiring block have any crimp points for securing to either the individual wires or the adjacent cable portion. Further, unlike a standard RJ45 plug, the wire troughs in the interior of the wiring block extend through the front end of the wiring block whereas in a standard RJ45 plug the wire troughs are capped (i.e., closed) at the front end of the standard RJ45 plug.

The length of the wiring block is a bit shorter than the length of a standard RJ45 plug. The amount of the length shortage of the wiring block is equal to the length of the front wall of a standard RJ45 plug. This makes the length of the wire troughs running through the interior of the wiring block the proper size, from the end of the individual wires back to where the outer sheath of the cable was removed, for placement into a standard RJ45 plug.

In order to use the wiring aid, a user initially strips a longer than normal length of the outer insulation sheathing from a terminating end of a CAT5 UTP cable. Ideally, this exposes about two or more inches of the twisted wire pairs of the cable. The user then slightly untwists the twisted wire pairs to fan out the individual wires. The user then inserts each individual wire into respective wire troughs of the wiring block. The user may refer to the color coding insignia on the handle of the wiring aid in order to obtain assistance in inserting the individual wires into the proper ones of the wire troughs of the wiring block to thereby ensure that the individual wires have been fanned out to have a proper orientation for later insertion into a RJ45 plug. Once the individual wires have been so inserted and are protruding from the front end of the wiring block, the user then pulls the individual wires through the wiring block until the outer insulation sheath of the adjacent cable portion sets itself inside the wiring block. The individual wires are now properly positioned and are at the correct length (inside the wiring block) for subsequent insertion into a RJ45 plug.

The user then cuts the exposed ends of the individual wires protruding from the front end of the wiring block. As a result, the individual wires of the terminating end of the cable are now at the correct length for insertion into a RJ45 plug. The user then removes the cable from the wiring block. The terminating end of the cable is now pre-formed. The user then inserts the terminating end of the cable into a RJ45 plug and crimps the RJ45 plug to the terminating end of the cable. As a result of the crimping, the individual wires make contact with the electrical connectors of the RJ45 plug and the adjacent cable portion has a sufficient amount of the outer insulation sheath to provide a strain relief. Due to the proper lengths of the individual wires and the adjacent cable portion, the proper ordering or orientation of the individual wires, and the proper exposure of the twisted wire pairs, the finished RJ45 termination will be assembled properly.

Referring now to FIG. 1, a terminating end of a CAT5 UTP cable 10 in which an outer insulation sheath 12 of the cable has been removed is shown. Cable 10 includes a plurality of individual wires 14 (such as eight individual wires) which are twisted in wire pairs (such as four twisted wire pairs). The twisted wire pairs further twist around one another to form an integrated twisted wire collection running longitudinally through the interior of cable 10 as shown in FIG. 1. Insulator coverings respectively surround and insulate each individual wire 14 so as to prevent the wires from electrically contacting one another. The insulator coverings are colored differently from one another to identify individual wires 14. Outer insulation sheath 12 surrounds and insulates the integrated twisted wire collection formed by the twisted individual wires 14. Removing outer insulation sheath 12 of cable 10 from the terminating end of the cable exposes the individual wires 14 at the terminating end of the cable as shown in FIG. 1. A user may then untwist and straighten out the exposed individual wires 14 in order to subsequently install a RJ45 plug on the terminating end of cable 10.

Figure 2:
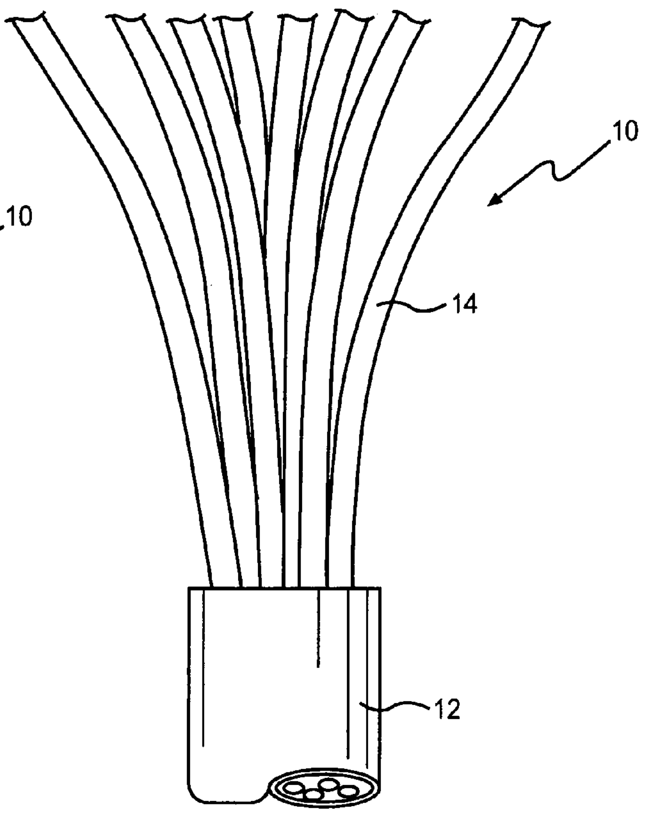
FIG. 2 illustrates the terminating end of the cable shown in FIG. 1 in which the individual wires of the exposed twisted wire pairs have been untwisted and straightened out.

Referring now to FIG. 2, with continual reference to FIG. 1, the terminating end of cable 10 in which individual wires 14 of the exposed twisted wire pairs have been untwisted and straightened out is shown. A user untwists and straightens out individual wires 14 at the terminating end of cable 10 in a side-by-side relationship that corresponds to a termination into a RJ45 plug. That is, the user laterally arranges the straightened out individual wires 14 into a specific configuration according to the color codes of the individual wires. Different wire configurations correspond to given types of CAT5 UTP terminations. As such, the user laterally arranges the straightened out individual wires 14 into a specific configuration that is appropriate for establishing a desired CAT5 UTP termination. The user uses the color coding of individual wires 14 to fan out the individual wires into the appropriate configuration.

Figure 3:
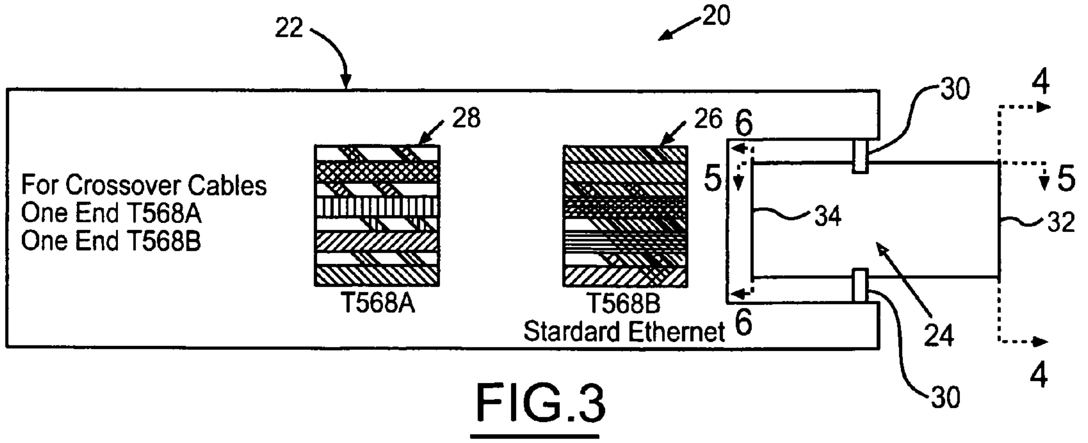
FIG. 3 illustrates a top view of a wiring aid in accordance with an embodiment of the present disclosure.

Referring now to FIG. 3, a top view of a wiring aid 20 in accordance with an embodiment of the present disclosure is shown. Wiring aid 20 includes a handle 22 and a wiring block 24 that attaches to the handle. Handle 22 includes diagrams 26, 28 representing two common wiring schemes used for CAT5 Ethernet terminations. Wiring block 24 attaches to handle 22 via a pair of pivots 30 that extend from the handle into respective holes in the sides of the wiring block. Pivots 30 permit wiring block 24 to be positioned in a way that is most advantageous to a user when using wiring aid 20 to pre-form a terminating end of cable 10.

A user inserts the terminating end of cable 10 into wiring block 24 in order to pre-form the terminating end of the cable for subsequent installation of a RJ45 plug onto the cable. Once the user pre-forms the terminating end of cable 10 using wiring block 24, the user removes the cable from the wiring block. The user then inserts the terminating end of cable 10, which has been pre-formed, into a RJ45 plug. The user then crimps the RJ45 plug to the terminating end of cable 10 in order to install the RJ45 plug onto the cable.

The pre-forming functions of wiring block 24 include: laterally arranging individual wires 14 at the terminating end of cable 10 in the configuration that is appropriate for establishing a desired CAT5 UTP termination; providing for the proper length of the individual wires which will be inserted into the RJ45 plug; and providing for the proper length of the outer sheathed portion of cable 10 at the terminating end of the cable which will also be inserted into the RJ45 plug.

Wiring block 24 is approximately the size of a standard RJ45 plug and is shaped like a standard RJ45 plug with several exceptions. Unlike a standard RJ45 plug, wiring block 24 does not have a retaining clip, any electrical connectors, or any crimp points for securing to either the individual wires 14 of the terminating end of cable 10 or outer insulation sheath 12 of the portion of the cable adjacent to the terminating end of the cable.

Wiring block 24 has a back end 32 and a front end 34. Wiring block 24 has wire troughs 38 (shown in FIGS. 4, 5, and 6) arranged within its interior. Wire troughs 38 receive individual wires 14 of a terminating end of cable 10 when a user inserts the terminating end of the cable into wiring block 24. That is, wire troughs 38 receive respective ones of individual wires 14 when a user inserts the terminating end of cable 10 into wiring block 24. Wire troughs 38 of wiring block 24 extend through the wiring block from a middle portion of the wiring block to front end 34 of the wiring block. Unlike a standard RJ45 plug, wire troughs 38 of wiring block 24 extend through front end 34 of the wiring block. That is, front end 34 has pass through holes 40 (shown in FIG. 6) which allow individual wires 14 inserted into wiring block 24 to extend out through front end 34 of the wiring block. In contrast, a standard RJ45 plug does not have such pass through holes at its front end.

The length of wiring block 24 is a bit shorter than the length of a standard RJ45 plug. The amount of the length shortage of wiring block 24 is equal to the length of the front wall of a standard RJ45 plug. This makes the length of wire troughs 38 running through the interior of wiring block 24 the proper size, from the end of individual wires 14 back to where outer insulation sheath 12 of cable 10 is removed, for placement into a standard RJ45 plug.

Figure 4:
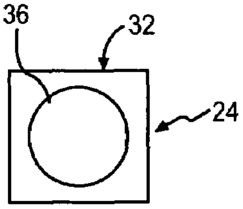
FIG. 4 illustrates a cross-sectional view of the back end of the wiring block of the wiring aid taken along the line 4-4 of FIG. 3.

Referring now to FIG. 4, with continual reference to FIG. 3, a cross-sectional view of back end 32 of wiring block 24 taken along the line 4-4 of FIG. 3 is shown. In operation, a user inserts a terminating end of cable 10 into back end 32 of wiring block 24. Back end 32 includes an opening 36 for receiving the terminating end of cable 10. Opening 36 leads to a cavity 37 arranged within the interior of wiring block 24. Opening 36 and cavity 37 are large enough to accommodate reception of sheathed portion of cable 10 adjacent to the terminating end of the cable. That is, opening 36 and cavity 37 are large enough to receive a portion of cable 10 in which outer insulation sheath 12 is present when the user inserts the terminating end of cable 10 into back end 32 of wiring block 24.

Figure 5:
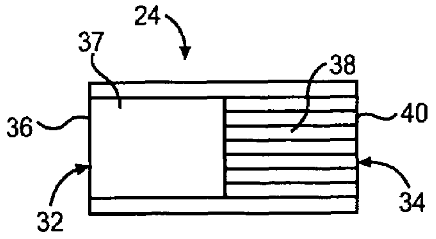
FIG. 5 illustrates a cutaway view of the wiring block of the wiring aid taken along the line 5-5 of FIG. 3.

Referring now to FIG. 5, with continual reference to FIGS. 3 and 4, a cutaway view of wiring block 24 taken along the line 5-5 of FIG. 3 is shown. As shown, opening 36 extends within the interior of wiring block 24 from back end 32 of the wiring block to the middle of the wiring block. As further shown, wiring block 24 includes a plurality of individual wire troughs 38 which are arranged within the interior of the wiring block. Wire troughs 38 extend within the interior of wiring block 24 from the middle of the wiring block to front end 34 of the wiring block. That is, wire troughs 38 extend within the interior of wiring block 24 between opening 36 and front end 34 of the wiring block. Each wire trough 38 receives a respective one of individual wires 14 of the terminating end of cable 10 when the user inserts the terminating end of the cable into and through back end 32 of wiring block 24. As such, wiring block 24 includes eight individual wire troughs 40.

Figure 6:
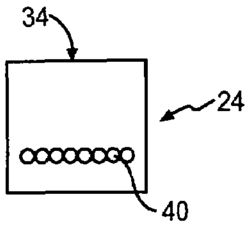
FIG. 6 illustrates a cross-sectional view of the front end of the wiring block of the wiring aid taken along the line 5-5 of FIG. 3.

Referring now to FIG. 6, with continual reference to FIGS. 3, 4, and 5, a cross-sectional view of front end 34 of wiring block 24 taken along the line 6-6 of FIG. 3 is shown. Front end 34 of wiring block 24 includes a plurality of pass through holes 40 which are part of and connected to wire troughs 38. As such, front end 34 of wiring block 24 includes eight individual pass through holes 40 (i.e., one pass through hole 40 for each wire trough 38). Individual wires 14 protrude through respective ones of pass through holes 40 when the user inserts the terminating end of cable 10 into opening 36 at back end 32 of wiring block 24 and through the wiring block.

Figures 7, 8:
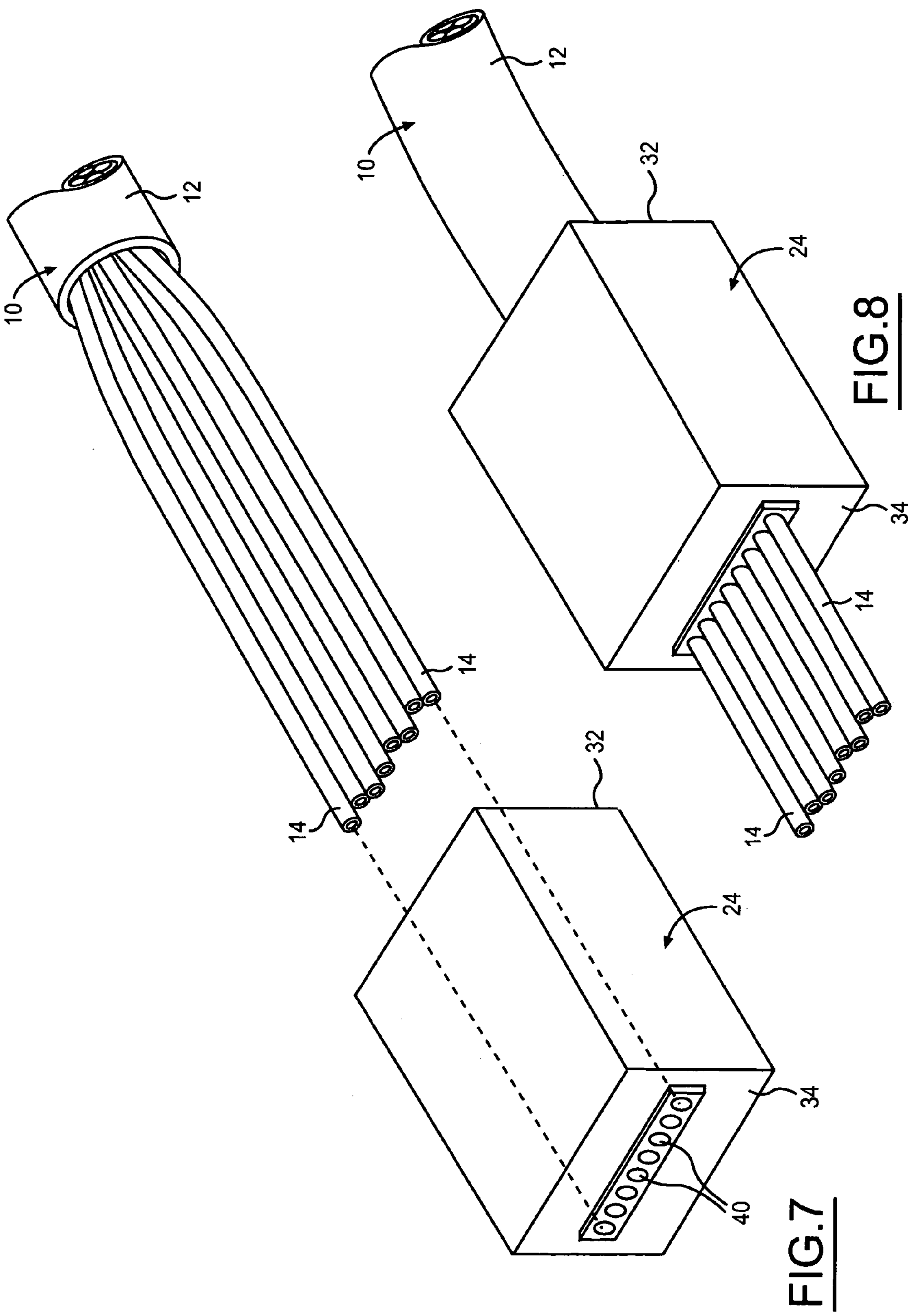
FIG. 7 illustrates a perspective view of the wiring block and a terminating end of the cable to be inserted into the wiring block.
FIG. 8 illustrates a perspective view of the wiring block and the terminating end of the cable which has been inserted into and through the wiring block.

Referring now to FIG. 7, a perspective view of wiring block 24 and a terminating end of cable 10 to be inserted into the wiring block is shown. As shown, a user places terminating end of cable 10 adjacent to back end 32 of wiring block 34 such that individual wires 14 of the terminating end of the cable face the back end of the wiring block. The user then inserts the terminating end of cable 10 into opening 36 of back end 32 of wiring block 24 such that the portion of cable 10 adjacent to the terminating end is received by the opening of wiring block 24 and such that individual wires 14 are received by respective wire troughs 38 of the wiring block. Wire troughs 38 receive proper ones of individual wires 14 as the user has fanned out the individual wires into the lateral configuration appropriate for establishing a CAT5 UTP cable termination.

Figure 10:
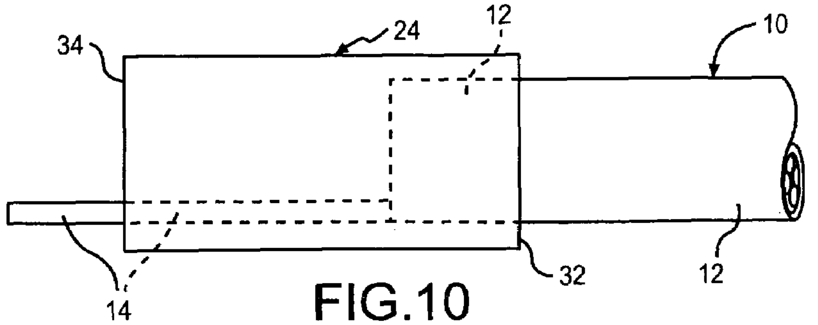
FIG. 10 illustrates a side view of the wiring block and the terminating end of the cable which has been inserted into and through the wiring block.
Figure 11:
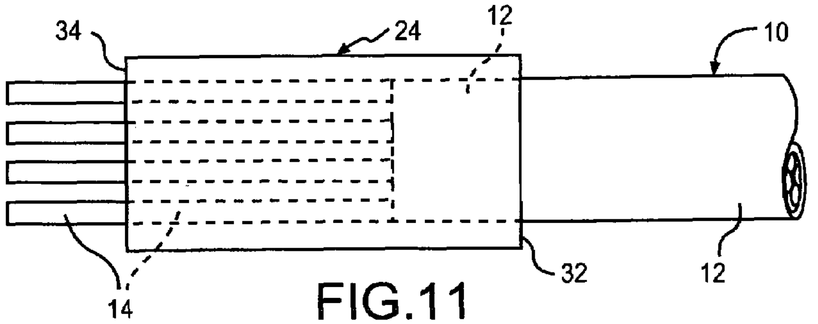
FIG. 11 illustrates a top view of the wiring block and the terminating end of the cable which has been inserted into and through the wiring block.

Referring now to FIG. 8, with continual reference to FIG. 7, a perspective view of wiring block 24 and the terminating end of cable 10 which has been inserted into and through the wiring block is shown. As shown, ends of individual wires 14 extend out from front end 34 of wiring block 24 through pass through holes 40. The user then pulls the protruding ends of individual wires 14 until outer insulation sheathing 12 of the adjacent cable portion sets itself inside wiring block 24 (i.e., until the outer insulation sheathing of the adjacent cable portion sets itself inside opening 36 where the opening meets wire troughs 38 in the middle of the wiring block). Individual wires 14 running through wire troughs 38 of wiring block 24 are now properly positioned and are at the correct length (the portion of individual wires 14 running inside the wiring block) for subsequent insertion into a RJ45 plug. FIGS. 10 and 11 illustrate respective side and top views of wiring block 24 and the terminating end of cable 10 which has been inserted into and through the wiring block.

Figure 12:
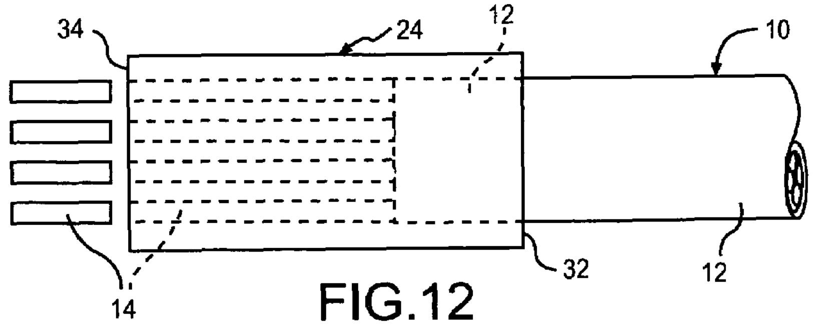
FIG. 12 illustrates a side view of the wiring block and the terminating end of the cable which has been inserted into and through the wiring block with the ends of the individual wires protruding out from the wiring block having been cut off.
Figure 9:
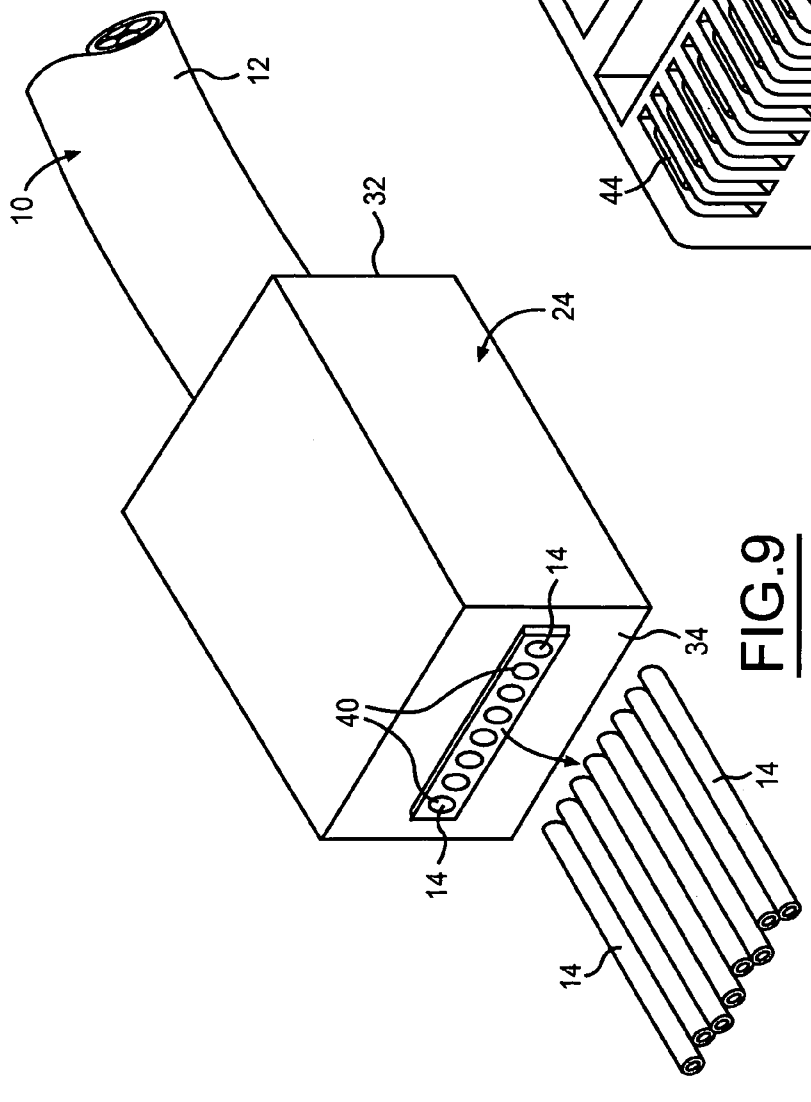
FIG. 9 illustrates a perspective view of the wiring block and the terminating end of the cable which has been inserted into and through the wiring block with the ends of the individual wires protruding out from the wiring block having been cut off.

Referring now to FIG. 9, with continual reference to FIGS. 7 and 8, a perspective view of wiring block 24 and the terminating end of cable 10 which has been inserted into and through the wiring block with the protruding ends of individual wires 14 having been cut off is shown. The user cuts off the protruding ends of individual wires 14. As a result, individual wires 14 of the terminating end of cable 10 are now at the correct length for insertion into a RJ45 plug. Thus, terminating end of cable 10 has now been pre-formed with the use of wiring block 24 for subsequent installation of a RJ45 plug. FIG. 12 illustrates a side view of wiring block 24 and the terminating end of cable 10 which has been inserted into and through the wiring block with the ends of individual wires 14 protruding out from the wiring block having been cut off.

Figure 13:
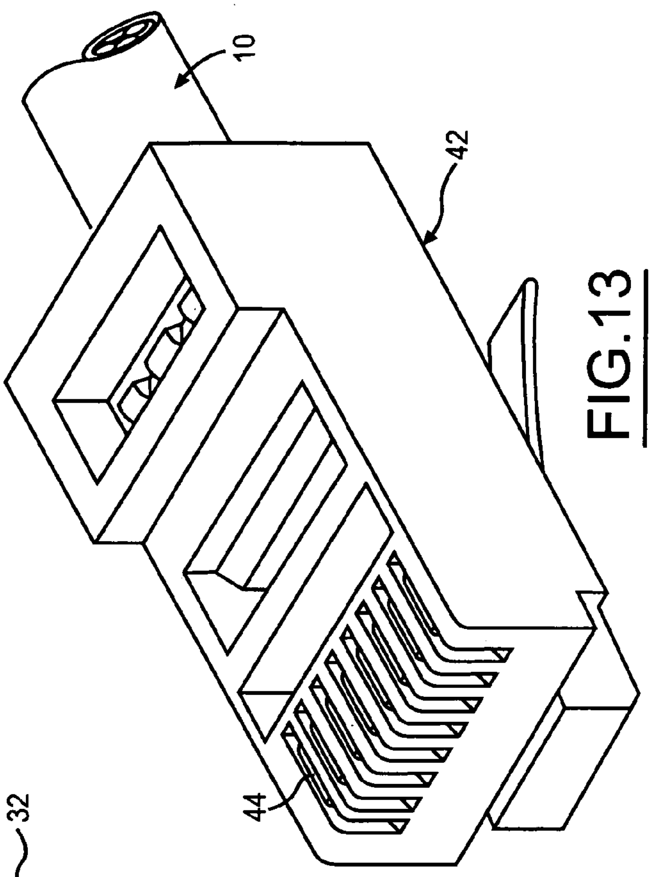
FIG. 13 illustrates a perspective view of a RJ45 plug installed on the terminating end of the cable in accordance with the present disclosure.

In order to complete the installation of a RJ45 plug onto the pre-formed terminating end of cable 10, the user removes the cable from wiring block 24. The user then inserts the terminating end of cable 10 into a standard RJ45 plug 42 (shown in FIG. 13) and crimps the RJ45 plug to the terminating end of the cable. As a result of the crimping, the individual wires make contact with electrical connectors 44 of RJ45 plug 42 and the adjacent cable portion has a sufficient amount of outer insulation sheath 12 to provide a strain relief. The finished RJ45 termination is assembled properly due to the proper lengths of individual wires 14 and the adjacent cable portion, the proper ordering or orientation of the individual wires, and the proper exposure of the twisted wire pairs.

The illustrations of embodiments described herein are intended to provide a general understanding of the structure of various embodiments, and they are not intended to serve as a complete description of all the elements and features of methods and apparatuses that might make use of the structures described herein. Many other embodiments will be apparent to those of skill in the art upon reviewing the above description. Other embodiments may be used and derived therefrom, such that structural and logical substitutions and changes may be made without departing from the scope of this disclosure. The Figures are merely representational and may not be drawn to scale. Certain proportions thereof may be exaggerated, while others may be minimized. Accordingly, the specification and drawings are to be regarded in an illustrative rather than a restrictive sense.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. An apparatus for preforming a terminating end of a cable having insulated twisted wire pairs for subsequent installation of a plug on the cable, the insulation of the terminating end of the cable being stripped such that the wires of the twisted wire pairs at the terminating end of the cable are exposed, wherein the wires of the twisted wire pairs have different colors, the apparatus comprising:

a handle a wiring block removably attachable to the terminating end of the cable and a portion of the cable which is adjacent to the cable end, wherein the wiring block is void of any crimp points used for securing an attachment of the wiring block to either the cable end or the cable portion;

a back end of the wiring block leading to a cavity arranged within the wiring block, the back end of the wiring block receiving the terminating end of the cable such that the cable portion sits inside the cavity with the wiring block thereby being attached to the cable end and the cable portion; and a front end of the wiring block having pass through holes leading to respective ones of wire troughs extending through the wiring block between the cavity and the front end of the wiring block, the wire troughs of the wiring block individually receiving the wires at the terminating end of the cable such that the wires are arranged in a configuration corresponding to a proper plug termination with the wire ends protruding out from the wiring block through the pass through holes;

wherein the cavity and the wire troughs of the wiring block correspond to a cavity and wire troughs of a plug which lacks pass through holes and is to be installed on the cable such that when the terminating end of the cable is inserted into the wiring block the wires at the terminating end of the cable have a length within the wire troughs of the wiring block corresponding to the length of the wire troughs of the plug, the configuration of the wires at the terminating end of the cable within the wire troughs of the wiring block corresponds to a configuration of the wire troughs of the plug for the proper plug termination, and the portion of the cable adjacent to the terminating end of the cable has a length within the cavity of the wiring block corresponding to the length of the cavity of the plug;

wherein after the wire ends protruding out from the wiring block through the pass through holes have been sheared off while the wiring block is attached to the cable end and the cable portion, the wiring block may be removed from the cable end and the cable portion to allow the installation of the plug onto the cable end and the cable portion;

wherein the wiring block is attached on opposite sides to the handle such that the front end of the wiring block faces toward the handle and the back end of the wiring block faces away from the handle;

wherein the handle includes a color coded legend corresponding to the proper plug termination;

wherein a comparison of the wire colors with the color coded legend of the handle assists in ensuring that the wires at the terminating end of the cable which are individually received by the wire troughs of the wiring block are arranged in the configuration corresponding to the proper plug termination, and the length of the wiring block is shorter than the length of the plug such that the amount of the length shortage of the wiring block is equal to the length of a front wall of the plug to thereby make the length of the wire troughs of the wiring block a proper size, from the end of the wires within the wire troughs of the wiring block back to where the insulation of the cable was stripped, for placement of the terminating end of the cable into the plug.

* * * * *